United States Patent [19]

Lai

[11] Patent Number: 5,564,536
[45] Date of Patent: Oct. 15, 1996

[54] TUNED MASS DAMPER

[75] Inventor: Ming-Lai Lai, Lake Elmo, Minn.

[73] Assignee: Minnesota Mining and Manufacturing Company, St. Paul, Minn.

[21] Appl. No.: 585,651

[22] Filed: Jan. 16, 1996

Related U.S. Application Data

[63] Continuation of Ser. No. 228,645, Apr. 18, 1994, abandoned.

[51] Int. Cl.$^6$ ........................................................ F16F 7/10
[52] U.S. Cl. ............................ 188/379; 267/33; 267/136; 52/167.2; 52/167.5
[58] Field of Search ................................. 188/378, 379, 188/380; 267/195, 292, 293, 136, 152, 153, 174, 33; 52/167.2, 167.4, 167.5, 167.6, 167.7, 167.8

[56] References Cited

U.S. PATENT DOCUMENTS

| | | |
|---|---|---|
| 3,605,953 | 9/1971 | Caldwell et al. . |
| 3,668,939 | 6/1972 | Schrader ............................. 188/380 X |
| 4,371,858 | 2/1983 | Kanoi et al. ......................... 188/380 X |

FOREIGN PATENT DOCUMENTS

| | | |
|---|---|---|
| 0089311 | 3/1983 | European Pat. Off. . |
| 0342074 | 4/1989 | European Pat. Off. . |
| 0509911A1 | 4/1992 | European Pat. Off. . |
| 0511055A1 | 10/1992 | European Pat. Off. ......... F16F 15/00 |
| 0583868A1 | 6/1993 | European Pat. Off. . |
| 957874 | 2/1950 | France ........................................... 5/3 |
| 4011367 | 10/1991 | Germany ................................ 188/378 |
| 0081864 | 7/1978 | Japan ..................................... 267/136 |
| 0086646 | 5/1982 | Japan ..................................... 188/380 |
| 63-53331 | 3/1988 | Japan .............................. F16F 15/02 |
| 0098727 | 4/1989 | Japan ..................................... 267/136 |
| 3163239 | 7/1991 | Japan ..................................... 188/380 |
| 4064743 | 2/1992 | Japan ..................................... 188/380 |
| 5302642 | 11/1993 | Japan ..................................... 188/380 |
| 1467281 | 3/1989 | U.S.S.R. ................................ 267/136 |
| WO88/05506 | 7/1988 | WIPO .............................. F16F 7/10 |

OTHER PUBLICATIONS

J. A. Inaudi et al. "Experimental verification of the seismic effectiveness of TMDs with viscoelastic materials" in *Earthquake Resistant Construction & Design: Proceedings of the Second International Conference*, Berlin, Jun. 1994; S. A. Savidia, Editor (pp. 559–566).

José A. Inaudi et al. *"Experiments on Tuned Mass Dampers Using Viscoelastic, Frictional and Shape–Memory Alloy Materials"* presented at the First World Conference on Structural Control, 3–5 Aug. 1994, Los Angeles, California (pp. TP3–127 to TP3–136).

$^A$ Patent Abstracts of Japan, vol. 12, No. 272 (M–724) [3119] Jul. 28, 1998 (for JP 63–53331 (A) entitled "Vibration Control Device").

Vibration Control Device, vol. 12, No. 272 (M–724) 3119) Jul. 28, 1988 PCT International Application No. PCT/US95/04585 International Search Report.

*Primary Examiner*—Robert J. Oberleitner
*Assistant Examiner*—Peter M. Poon
*Attorney, Agent, or Firm*—Gary L. Griswold; Walter N. Kirn; Janice L. Dowdall

[57] ABSTRACT

An apparatus for damping dynamic response in a primary structure, includes a secondary mass, and a spring and a viscoelastic element, the spring and viscoelastic element interposed between the primary structure and the secondary mass. The apparatus may include a housing for the secondary mass, the spring and the viscoelastic element, should the spring, viscoelastic element, or both the spring and viscoelastic element, be interposed between the secondary mass and the housing. A method for damping dynamic response in a primary structure is also disclosed.

21 Claims, 2 Drawing Sheets

TUNED MASS DAMPER

This is a file wrapper continuation of application Ser. No. 08/228,645, filed Apr. 18, 1994, now abandoned.

FIELD OF THE INVENTION

This invention relates to an apparatus that can be used for damping the dynamic responses of structures when the structure experiences vibrational motion resulting from momentary forces acting on the structure.

BACKGROUND

Momentary forces on a structure can induce dynamic responses into the structure, including vibrations, which can weaken the structure, subject its occupants to the unpleasantness or hazards associated with this vibratory motion, and adversely impact the performance of equipment located within the structure. Accordingly, solutions to damp these dynamic responses in structures have been sought.

For example, Japanese Patent Applications 62-328916 and 61-12569 describe damping systems having springs and dashpots suspending a secondary mass or weight from a primary mass. Japanese Patent Application 62-328916 describes a weight connected to a floor by two springs and two dashpots, for damping oscillations in the floor. Japanese Patent Application 61-12569 describes a tuned damping system where the mass of the weight, and the spring constant of the spring element are chosen such that the frequency of the system is tuned to the natural frequency of the floor or ceiling element to be damped. This tuning enhances the damping ability of the system.

Kim and Yeo, "Application of Viscoelastic Material for a Dynamic Damper" in Journal of Vibration, Acoustics, Stress, and Reliability in Design, Vol. 108 (July 1986) pp. 378–381, reported that some damping systems employed springs, or springs in conjunction with friction or fluid dashpots, to suspend a damper mass from a primary mass. Their paper describes a viscoelastic material under prestrain used in conjunction with a damper mass as a system for replacing the spring and dashpot damping systems.

Halverson and Hansen, "Use of Rubber Materials in Tuned Dampers for Vibration and Noise Control", in Rubbercon '88, describes a tuned damping system using a rubber material as the spring element between a mass element and a base structure.

Viscoelastic materials are also used in structural damping applications. For example, U.S. Pat. No. 3,605,953 to Caldwell et al., Mahmoodi, "Structural Dampers" in *Journal of the Structural Division, Proceedings of the American Society of Civil Engineers*, 1661 (August 1969), and Keel and Mahmoodi, "Design of Viscoelastic Dampers for Columbia Center Building," in *Building Motion in Wind*, Proceedings of a session sponsored by the Aerodynamics Committee of the Aerospace Division and the Wind Effects Committee of the Structural Division of the American Society of Civil Engineers in conjunction with the ASCE convention in Seattle, Wash., Apr. 8, 1986, describe dampers, which show layers of metal plates having viscoelastic material between the plates. The viscoelastic material of the dampers transfers a portion of the vibratory energy of the structure into heat, which is subsequently dissipated into the surroundings.

SUMMARY OF THE INVENTION

The present invention provides a damping system comprising a mass suspended from a structure by a spring and a viscoelastic material. The interaction between the mass, the spring and the viscoelastic material components of the damping system is such that when force is applied to the structure, creating a dynamic response therein, the system damps the vibrations associated with the dynamic response.

BRIEF DESCRIPTION OF THE DRAWINGS

The present invention will be described with reference to the accompanying drawings wherein like reference numerals identify corresponding or like components, and.

DETAILED DESCRIPTION OF THE DRAWINGS

Figure 1:
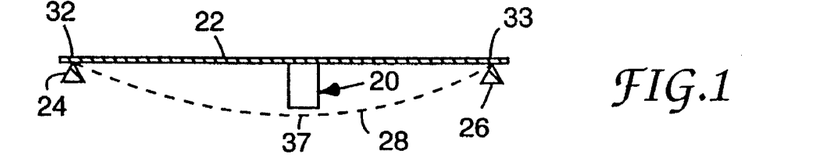
FIG. 1 is a side view of the apparatus of the present invention mounted on a simple supported beam in a first mode of vibration.
Figure 2:
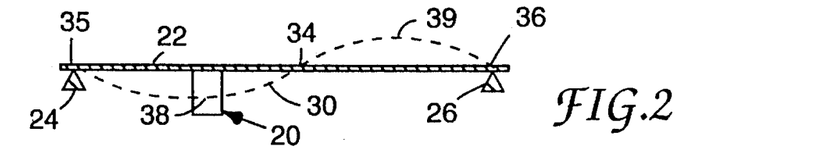
FIG. 2 is a side view of the apparatus of the present invention mounted on a simple supported beam in a second mode of vibration.

Turning now to FIGS. 1 and 2, the damping apparatus 20 of the present invention is positioned along a simple supported beam 22. The beam 22 is held in place at its ends by supports 24 and 26. In FIG. 1, broken line 28 indicates the first mode of vibration of the beam 22. In FIG. 2, broken line 30 indicates the beam 22 in a second mode of vibration.

In FIG. 1, the vibration includes nodes 32, 33 at the ends of the beam 22. In FIG. 2, the vibration includes nodes 34, 35, 36 at the center and the ends of the beam 22. For optimum damping, the apparatus 20 should be placed as close as possible to the antinodes 37, 38, 39.

Figure 3:
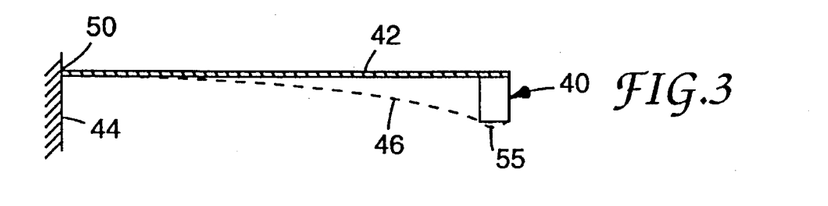
FIG. 3 is a side view of the apparatus of the present invention mounted on a cantilever beam in a first mode of vibration.
Figures 4, 5:
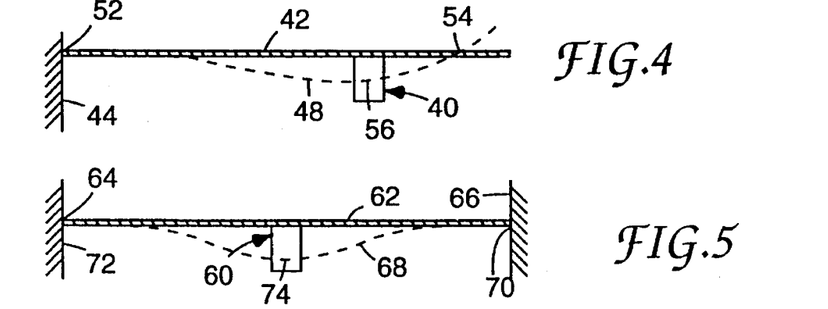
FIG. 4 is a side view of the apparatus of the present invention mounted on a cantilever beam in a second mode of vibration.
FIG. 5 is a side view of the apparatus of the present invention mounted on a clamped-clamped beam in a first mode of vibration.

FIGS. 3 and 4 show the damping apparatus 40 of the invention positioned on a cantilever beam 42, anchored to a single support 44. Two exemplary modes of vibration are shown by broken lines 46, 48. The vibration detailed in FIG. 3 has a node 50 at the junction of the beam 42 and the support 44. The vibration detailed in FIG. 4 includes two nodes 52, 54 on the beam 42. For maximum damping, the apparatus 40 of the invention should be placed as close as possible to the antinodes 55, 56. Should the apparatus 40 be placed directly at the nodes 50, 52, 54, the damping function of the apparatus 40 will be minimal.

In FIG. 5, the damping apparatus of the invention 60 is positioned on a clamped-clamped beam 62. The ends of this clamped-clamped beam 62 are held by supporting structures 64, 66. The mode of vibration is detailed by broken line 68, and includes nodes 70, 72, on the beam 62. Maximum damping may be achieved by placing the damping apparatus 60 as close as possible to the antinode 74.

Figure 6:
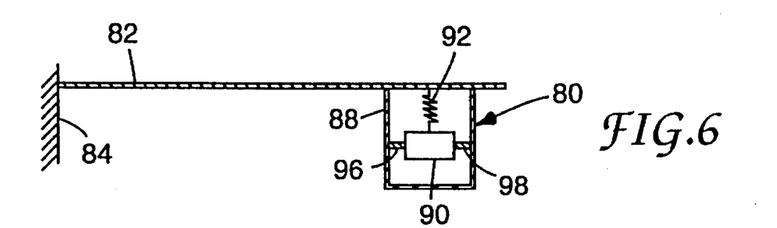
FIG. 6 is a cross sectional view of a first apparatus of the invention.

In FIG. 6, a detailed cross section of the apparatus 80 of the present invention is shown on a cantilever beam 82. The beam 82 is mounted to a support structure 84, such as a wall or the like. The apparatus includes a housing 88 mounted to the beam 82 which encloses a secondary or damping mass 90, an associated spring 92, and laterally mounted viscoelastic elements 96, 98, which for this apparatus 80 are viscoelastic material components. The housing 88 is normally made of metal, plastic, or other suitable material, and is attached to the beam 82 by conventional fastening techniques such as welding, mechanical fastening, adhesive bonding, or the like. The housing 88 may have an open base, although a complete enclosure, which prevents foreign matter from entering the housing 88 that could adversely impact the performance of the damping apparatus, is preferred.

The secondary mass 90, in conjunction with the spring 92 and viscoelastic elements 96, 98, damps vibrations in the beam 82 by converting them into heat energy. The secondary mass 90 is typically a block of metal, however fluid filled containers or blocks of high density materials, e.g. concrete, may also be used. Materials of lower density, such as aluminum, wood, or synthetic materials, may be utilized for applications requiring smaller secondary masses.

The spring 92 is attached to both the beam 82 and the secondary mass 90 by conventional fastening techniques such as welding, mechanical fastening, adhesive bonding or the like. Although a single spring is shown, additional springs positioned between the sides, bottom, or top of the secondary mass 90 and the base or sidewalls of the housing 88 may be used. Other types of springs such as flat springs or leaf springs which provide sufficient restoring forces may also be used.

The viscoelastic elements 96, 98 are attached at the sides of the secondary mass 90 and the sidewalls of the housing 88. The viscoelastic material which forms these elements translates the mechanical energy associated with the dynamic response, e.g., vibrations and oscillations, in the beam 82 into heat energy. The viscoelastic elements shown in FIG. 6 (as well as in FIGS. 7–10) are rectangular in cross-section. Viscoelastic elements having circular or parallelogram cross-sections may also be utilized, with appropriate adjustments in the shear cross sectional area and thickness to provide the desired damping performance. It is preferable to keep the shear forces dominant in the viscoelastic material by keeping the ratio of the dimension of the viscoelastic material parallel to the shear forces to the thickness of the viscoelastic material greater than or equal to 5.

The preferred viscoelastic material is Scotchdamp™ SJ2015X acrylic viscoelastic polymer, types 110, 112 and 113 available from 3M, St. Paul, Minn., and described in Suggested Purchase Specification, Scotchdamp™ Viscoelastic Polymers, No. 70-072-02257(89.3)R1 from 3M Industrial Specialties Division. Other suitable viscoelastic materials include but are not limited to Lord LD-400 from Lord Corporation, Erie, Pa., and Soundcoat DYAD 606, Soundcoat DYAD 609, and Soundcoat N, from Soundcoat, Inc., Deer Park, N.Y.

Viscoelastic materials are temperature sensitive. Specifically, Chang et al., "Viscoelastic Dampers as Energy Dissipation Devices for Seismic Applications" in *Earthquake Spectra*, Vol. 9, No. 3 (1993) pp. 371–387, noted that an increase in ambient temperature softens the viscoelastic material and the damping efficiency of the material decreases. Additional temperature sensitivity information on Scotchdamp™ SJ2015X, types 110, 112, and 113 are provided in the above-referenced Suggested Purchase Specification. Accordingly, temperature changes in the viscoelastic material must be considered when constructing the apparatuses of the present invention.

The viscoelastic elements 96, 98 are preferably attached to the housing 88 and the secondary mass 90 by conventional fastening techniques such as mechanical fastening, adhesive bonding, or the like. Two viscoelastic elements 96, 98, one on each side of the secondary mass 90, connecting the secondary mass 90 to the housing 88, are preferred, but additional viscoelastic elements may be incorporated between the housing 88 and the secondary mass 90.

Figure 7:
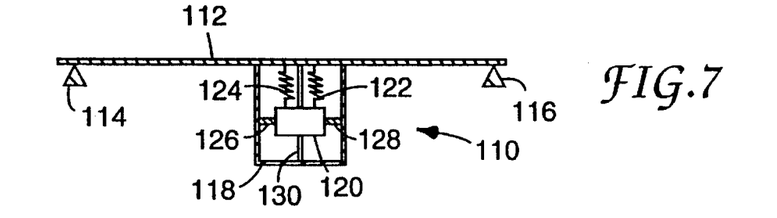
FIG. 7 is a cross sectional view of a second apparatus of the invention.

In FIG. 7, the apparatus 110 of the present invention is illustrated on a simple supported beam 112, which is mounted to support structures 114, 116. The apparatus 110 includes a housing 118, mounted to the beam 112 which encloses a secondary mass 120. This secondary mass 120 is suspended vertically from the beam 112 by springs 122, 124 and laterally, by viscoelastic elements 126, 128. The viscoelastic elements 126, 128 for this apparatus 110 are viscoelastic material components. A rod 130, extending through the secondary mass 120 and joined to the base of the housing 118 and the bottom of the beam 112 by conventional fastening techniques such as welding, mechanical fastening adhesive bonding or the like, serves to constrain the secondary mass 120 to vertical movement. Alternately, the rod 130 may be joined at only the beam 112 or the base of the housing 118. Additional springs or viscoelastic elements may be used to suspend the secondary mass 120 from the beam 112.

Figure 8:
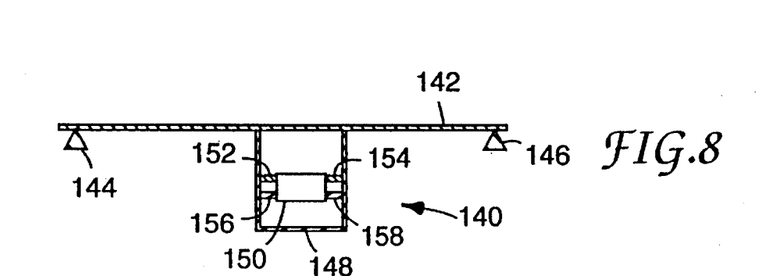
FIG. 8 is a cross sectional view of a third apparatus of the invention.

In FIG. 8, the apparatus 140 of the present invention is illustrated on a simple supported beam 142. The beam 142 is mounted to support structures 144, 146. The apparatus 140 includes a housing 148 mounted to the beam 142 which encloses a secondary mass 150, that is suspended within the housing 148 both by flat springs 152, 154 viscoelastic elements 156, 158 having viscoelastic material components. The flat springs 152, 154 and viscoelastic elements 156, 158 are on opposite sides of the secondary mass 150. While a spring and a viscoelastic element on each side of the secondary mass are preferred, additional springs or viscoelastic elements may be used.

Figure 9:
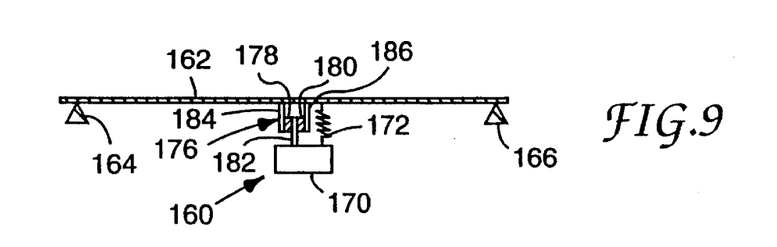
FIG. 9 is a cross sectional view of a fourth apparatus of the invention.

In FIG. 9, the apparatus 160 of the invention is illustrated in a configuration suitable for damping a simple supported beam 162. In such a system, a beam 162 is fixed at its ends by supports 164, 166. The apparatus 160 has a secondary mass 170 suspended from the beam 162 by a spring 172 and a viscoelastic element 176. The spring 172 may be fastened to the primary structure and the secondary mass 170 as described above. Although a single spring and a single viscoelastic element is shown, additional springs or viscoelastic elements may be used.

The viscoelastic element 176 represents an alternate layered design comprising viscoelastic material components 178, 180 and rigid components 182, 184, 186. This layered design increases the shear area of the viscoelastic material without significantly increasing the size of the viscoelastic element 176.

The rigid components 182, 184, 186 of the viscoelastic element 176 are made of metal or plastic, although other materials including wood or synthetics may be used. The rigid components 182, 184, 186 must be of sufficient rigidity to maximize the ability of the viscoelastic material to absorb the mechanical energy associated with the dynamic response and convert it into heat energy. The rigid components are preferably arm-like members although other suitable components may also be used. It is anticipated that the connections between viscoelastic element 176, the beam 162 and the secondary mass 170 can be reversed such that the central rigid component 182 attaches to the beam 162 while the lateral rigid components 184, 186 attach to the secondary mass 170.

Other configurations involving single or multiple portions of viscoelastic materials for the viscoelastic material components may also be used. Alternate arrangements of viscoelastic components and rigid components may also be used provided that the rigid components are attached to the beam and the secondary mass in an alternating manner, and are separated from one another by an intermediate viscoelastic component.

Figure 10:
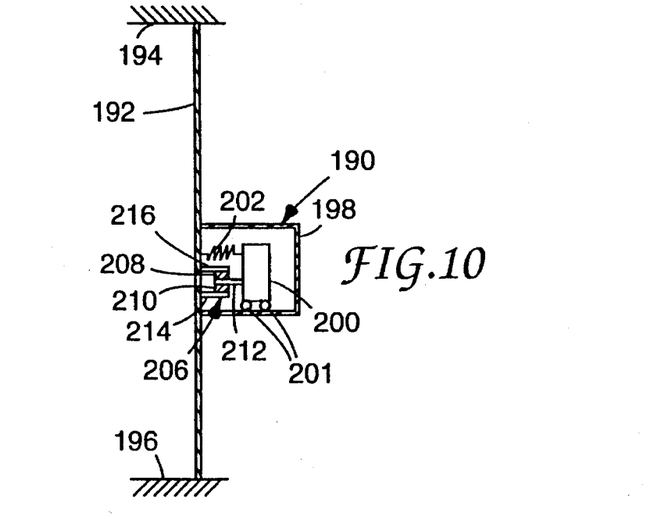
FIG. 10 is a cross sectional view of a fifth apparatus of the invention.

FIG. 10 illustrates the apparatus 190 of the present invention on a vertically mounted clamped-clamped beam 192, mounted to support structures 194, 196. The apparatus 190 includes a housing 198 mounted to the beam 192 which encloses a secondary mass 200. This secondary mass 200 is supported on rollers 201 or other structures which enable horizontal movement of the secondary mass 200. The secondary mass 200 is attached to the beam 192 by a spring 202 and a viscoelastic element 206. The viscoelastic element 206 has viscoelastic material components 208, 210 separated by a central rigid component 212 and lateral rigid components 214, 216, which are attached to beam 192 and secondary mass 200, respectively. The viscoelastic element 206 employed in this apparatus 190 is similar to that described in FIG. 9 above. Although a single spring and a single viscoelastic element are shown, additional springs or viscoelastic elements may be used.

Figure 11:
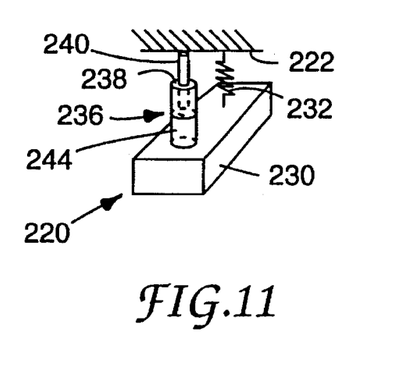
FIG. 11 is a partial cross sectional view of a sixth apparatus of the invention.

FIG. 11 shows a damping apparatus 220 mounted on a beam 222. The apparatus 220 includes a secondary mass 230, connected to the beam 222 by a spring 232 and a viscoelastic element 236.

The viscoelastic element 236 includes a cylindrical viscoelastic material component 238, an inner cylindrical rigid component 240, which is connected at one end to the beam 222, and an outer cylindrical rigid component 244, which is connected at one end to the secondary mass 230. The cylindrical viscoelastic material component 238 is adhesively attached to the inner cylindrical rigid component 240 and the outer cylindrical component 244. The cylindrical rigid components 240, 244 are preferably attached to the beam 222 and the secondary mass 230 by the methods described above. Alternately, the inner cylindrical rigid component 240 could be attached to the secondary mass 230 and the outer cylindrical rigid component 244 could be connected to beam 222 using the above described fastening techniques. Although a single spring and a single viscoelastic element are shown, additional springs or viscoelastic elements may be used.

Figure 12:
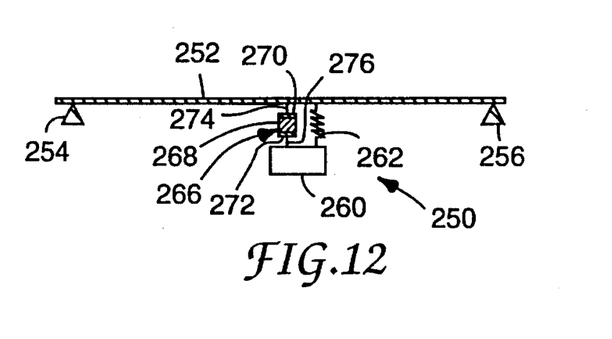
FIG. 12 is a cross sectional view of a seventh apparatus of the invention.

Turning now to FIG. 12, the apparatus 250 of the invention is illustrated on a simple supported beam 252, mounted at its ends to supports 254, 256. The apparatus 250 has a secondary mass 260 suspended from the beam 252 by a spring 262 and a viscoelastic element 266. Although a single spring and a single viscoelastic material are shown, additional springs or viscoelastic elements may be used.

The viscoelastic element 266 for the system includes a viscoelastic material component 268, which is preferably adhesively attached, between two plates 270, 272. The plates 270, 272 are connected to rods 274, 276 by welding, mechanical fastening, adhesive bonding or the like. The rods 274, 276 are connected to the beam 252 and the secondary mass 260 respectively. The plates 270, 272 in conjunction with rods 274, 276 form the rigid component of the viscoelastic element. This sandwich-like arrangement of the viscoelastic material component 268 between the plates 270, 272 places the viscoelastic element 268 into a compressive mode, as opposed to the shear mode, which is common to the viscoelastic elements shown in FIGS. 6–11.

All of the above illustrations of the present invention are tuned systems. A tuned system is one in which the secondary mass and the spring constants of the springs and viscoelastic elements are designed to vibrate at approximately the natural frequency of the primary mass. Based on a series of equations associated with tuning, the dimensions of the viscoelastic material for each apparatus to be constructed in accordance with the present invention can be determined.

Tuning is accomplished in accordance with an equation for optimum tuning frequency ($\omega_{opt}$) and optimum damping ratio ($\zeta_{opt}$), to minimize the response of the primary structure. Both optimum tuning frequency ($\omega_{opt}$) and optimum damping ratio ($\zeta_{opt}$) are dependent on the mass ratio ($\mu$), determined by the mass of the secondary mass ($m_2$) divided by the effective or scaled mass of the primary structure ($m_1$) or:

$$\mu = m_2/m_1 \qquad (1)$$

The scaled mass ($m_1$) is determined by multiplying the actual mass of the primary structure (M) by the scaling factor (Z) plus the mass of the housing ($M_H$) if there is a housing for the particular application or:

$$m_1 = ZM + M_H \qquad (2)$$

According to Harris and Crede, *Shock and Vibration Handbook*, McGraw-Hill Book Company (1976), some typical scaling factors (Z) are: 0.375 for a clamped-clamped beam, 0.5 for a simple supported beam, 0.23 for a cantilever beam with an end load, and 0.333 for a spring, when the spring is the primary structure to be damped. Mass ratios ($\mu$) can range from 0.001 to 1.000, but normally range from 0.005 to 0.500.

The optimum tuning frequency ($\omega_{opt}$) and damping ratio ($\zeta_{opt}$) can be determined with known external excitation forces to the structure. They are related to the properties of the damper as:

$$\omega_{opt}^2 = \frac{k'_v + k_s}{m_2} \qquad (3)$$

and $$\zeta_{opt} = \frac{\eta}{2} \frac{k'_v}{k_s + k'_v} \qquad (4)$$

where $k_v'$ is the storage stiffness (spring constant) of the viscoelastic material;

$k_s$ is the stiffness (spring constant) of the spring;

$m_2$ is defined above; and $\eta$ is a temperature and frequency-dependent parameter for representing the loss factor of the viscoelastic material, and is supplied by the manufacturer.

Simultaneous solution of equations (3) and (4) above provides the following expressions for spring stiffness (spring constant) of the spring ($k_s$) and storage stiffness (spring constant) of the viscoelastic material ($k_v'$), respectively:

$$k_s = \left(1 - \frac{2\zeta_{opt}}{\eta}\right) \omega_{opt}^2 m_2 \quad (5)$$

$$k'_v = \frac{2\zeta_{opt}}{\eta} \omega_{opt}^2 m_2 \quad (6)$$

A special subset occurs when there is no damping in the primary structure and the optimum tuning frequency ($\omega_{opt}$) can be defined as shown by Den Hartog, *Mechanical Vibrations,* McGraw Hill, New York, (4th ed. 1956).

$$\omega_{opt} = \omega_1 \frac{1}{1+\mu} \quad (7)$$

where $\omega_1$ is the natural frequency of the primary structure.

Under the same circumstances, the optimum damping ratio ($\zeta_{opt}$) can be defined as:

$$\zeta_{opt} = \sqrt{\frac{3\mu}{8(1+\mu)^3}} \quad (8)$$

Substituting these expressions for their corresponding values in equations (5) and (6) above, the expressions for the spring constant of the spring ($k_s$) and the spring constant for the viscoelastic material ($k_v'$) become:

$$k_s = \frac{\omega_1^2 m_1 \mu}{(1+\mu)^2} \left(1 - \frac{1}{\eta} \sqrt{\frac{3\mu}{2(1+\mu)^3}}\right) \quad (9)$$

$$k'_v = \frac{\omega_1^2 m_1 \mu}{\eta} \sqrt{\frac{3\mu}{2(1+\mu)^7}} \quad (10)$$

where $\omega_1$, $m_1$, $\mu$ and $\eta$ are defined as above.

Knowing the stiffness (spring constant) ($k_s$) of the spring or springs, from equation (9) above, the spring or springs can be selected from the spring manufacturer. The spring constant of the viscoelastic material ($k_v'$) can be expressed as a function of the viscoelastic material, e.g. the cross-sectional area (A) and thickness (h) for the viscoelastic material in the shear mode as follows:

$$k'_v = \frac{G'A}{h} \quad (11)$$

where

G' is the storage shear modulus of the viscoelastic material.

Equation (11) above can then be rearranged to determine the cross-sectional area (A) of the viscoelastic material in the shear mode as:

$$A = \frac{k'_v h}{G'} \quad (12)$$

Alternately, if the viscoelastic material is in a compression mode, the cross-sectional area of the viscoelastic material (A) is:

$$A = \frac{k'_v l}{Ek_T} \quad (13)$$

where l is the length of the viscoelastic material in the compression mode;

$k_T$ is the shape factor described in Nashof, A.D., Jones, D.I.G., and Hendersen, J. P., *Vibration Damping,* Wiley Interscience Publications, John Wiley & Sons, New York, 1985, pp. 194–195, given by:

$$k_T = 1 + \beta \left(\frac{A}{A'}\right)^2$$

where $\beta$ is a non-dimensional constant equal to 2 for an unfilled viscoelastic material and 1.5 for a filled viscoelastic material;

A is the cross-sectional area of the viscoelastic material;

A' is the non-load carrying area of the viscoelastic material; and

E is the storage modulus of the viscoelastic material, which when in the compression or extension mode:

$$E = 3G' \quad (14)$$

The maximum displacement ($Y_{max}$) of the secondary mass ($m_2$) relative to the primary structure is determined, since the shear strain for the viscoelastic material ($\gamma$) is provided by the manufacturer and displacement of the secondary mass ($Y_{max}$) is related to the shear strain ($\gamma$) as follows:

$$\gamma = \frac{Y_{max}}{h} \quad (15)$$

Equation (15) can then be rearranged to determine the thickness (h):

$$h = \frac{Y_{max}}{\gamma} \quad (16)$$

In the compression or extension mode, the length (l) can be determined similarly.

In the situation where maximum displacement ($Y_{max}$) of the secondary mass ($m_2$) is unknown, the theoretical maximum displacement of the secondary mass ($m_2$) can be found by solving the coupled equations describing the motions of the secondary mass (Y(t)) relative to the effective primary mass and the effective primary mass (X(t)) respectively, where:

$$\ddot{X}(t) + 2\zeta_1 \omega_1 \dot{X}(t) + \omega_1^2 X(t) = P_1(t) + 2\mu \zeta_2 \omega_2 \dot{Y}(t) + \mu \omega_2^2 Y(t) \quad (17)$$

$$\ddot{Y}(t) + 2\zeta_2 \omega_2 \dot{Y}(t) + \omega_2^2 Y(t) = -\ddot{X}(t) \quad (18)$$

where $\ddot{X}$ is the acceleration of the primary system;

$\ddot{Y}$ is the relative acceleration of the secondary mass;

$\dot{X}$ is the velocity of the primary system;

$\dot{Y}$ is the relative velocity of the secondary mass;

$\zeta_1$ is the damping ratio of the primary system;

$\zeta_2 = \zeta_{opt}$ as the damping ratio of the secondary system; and $P_1(t) = F_1(t)/m_1$, and $F_1(t)$ is the external excitation force.

The equations (17) and (18) can be simultaneously solved using the transition matrix method as described by L. Meirovitch, *Elements of Vibration Analysis,* McGraw-Hill, Inc. (1986) pp. 477–497. Actual solution of these equations by the above-referenced method is facilitated by the use of the Control System Toolbox software Version 3.0b available from The Math Works, Inc., Natick, Mass., following the User's Guide directions provided with the software package. The solution output provided by this software package plots the relative displacement of the secondary mass as a function of time to provide an indication of the damping performance of the damping apparatus. Maximum displacement ($Y_{max}$) of the secondary mass relative to the primary structure is obtained directly from this plot and substituted into equation (16) to calculate the thickness and subsequently the dimensions of the viscoelastic material.

Although the above equations were designed for a single damper on the primary structure, they are equally applicable to systems employing multiple dampers. Adjustments of these parameters to accommodate such systems would be well known to the skilled artisan.

EXAMPLE

A tuned mass damping system was constructed in accordance with the disclosure above for a cantilever beam apparatus. The cantilever beam consisted of a steel plate 30.50 cm×12.70 cm×0.16 cm (12 in.×5 in.×0.0625 in.) and the housing for the damping system which was attached to the beam. The combined mass of the beam and housing was 546.2 gm (476.7 gm for the beam and 69.5 gm for the housing), which, using the scaling factor of 0.23 for a cantilever beam as described above and equation (2) above translates to a scaled mass of 179.1 gm. The secondary mass was selected to have a mass of 77.2 gm such that the mass ratio ($\mu$) from equation (1) above yielded $$\mu = 0.43$$

From the material chosen for the cantilever, its frequency ($\omega_1$) was known to be 12 Hertz. The optimum frequency of the damper is 8.4 Hz. Additionally, the acrylic viscoelastic polymer material, Scotchdamp™ SJ 2015X type 112 had a storage shear modulus (G') of 2.46 kg/cm² (35 pounds per square inch) and a loss factor ($\eta$) of 0.9 at 24° C.

These values were then applied to equations (5)–(8) above to determine the spring stiffnesses of the spring ($k_s$) and of the viscoelastic material ($k_v'$) to yield a spring constant for the spring ($k_s$) of 0.095 kg/cm (0.53 pounds per inch) and a spring constant for the viscoelastic material ($k_v'$) of 0.11 kg/cm (0.59 pounds per inch).

Design requirements for the damping apparatus required two viscoelastic bands on opposite sides of the secondary mass ($m_2$) connected to the sidewalls of the housing, having a thickness (h) of 0.51 cm (0.2 inches). The cross-sectional area for each of the two pieces of viscoelastic material was calculated to be 0.011 cm² (0.0017 in²) using equation (12) above. Based on this calculation and a desire to use a square cross-sectional area for the viscoelastic material, an optimal dimension of 0.10 cm (0.13 inches) for each side of the square for a viscoelastic material in a pure shear mode was calculated. The dimensions of the above apparatus placed the viscoelastic material in a bending mode as well as a shear mode, resulting in the stiffness of the viscoelastic material being reduced. To compensate for this loss of stiffness, the cross-sectional area of the viscoelastic material was increased to 0.18 cm×0.23 cm per side.

A spring with a spring constant ($k_s$) of 0.98 kg/cm, as determined above was attached to both the cantilever beam and the secondary mass. The viscoelastic material having minimum dimensions of 0.18 cm×0.23 cm×0.51 cm was adhesively attached to the secondary mass and the sidewalls of the housing. The housing was further designed to allow the secondary mass to be fixed to the housing by inserting a pin through the housing wall and into the secondary mass. Fixing the position of the secondary mass rendered the damping system inoperable and allowed a visual demonstration of the effectiveness of the damping system when the pin was removed. Foam pieces were attached to the sides of housing to reduce side impacts between the secondary mass and the housing.

With the pin in place, the beam was downwardly displaced 1.0 cm and released to initiate vibration in the beam. Vibrations gradually diminished over a period of approximately 10 seconds before they substantially subsided.

In a similar manner, the pin was removed to release the secondary mass and the beam was downwardly displaced 1.0 cm and released to initiate vibration in a damped system. In this instance, vibrations subsided in less than 0.5 second, demonstrating the effectiveness of the damper.

The apparatus of the present invention can be applied to small structures as well as to large structures by modifying the springs, the type and amount of viscoelastic material and the weight of the secondary or damping mass. The same principles can be applied to damping apparatuses requiring non-vertical or non-horizontal orientations.

While apparatuses of the present invention have been described so as to enable one skilled in the art to practice the techniques of the present invention, the preceding description is intended to be exemplary and should not be used to limit the scope of the invention. The scope of the invention is defined by the following claims.

What is claimed is:

1. A damping apparatus for controlling a dynamic response of a primary structure, the primary structure having a natural vibrational frequency, said damping apparatus comprising:

a secondary mass;

at least one spring interposed between the primary structure and the secondary mass;

at least one viscoelastic element interposed between the primary structure and the secondary mass;

wherein said at least one spring and said at least one viscoelastic element are tuned to a frequency to provide said damping apparatus with a vibrational frequency of approximately said natural vibrational frequency of said primary structure; and whereby when said dynamic response is initiated in the primary structure, the dynamic response is damped.

2. The apparatus of claim 1, wherein there are a plurality of springs interposed between the primary structure and the secondary mass.

3. The apparatus of claim 1, wherein the viscoelastic element comprises at least one viscoelastic material component.

4. The apparatus of claim 3, wherein the viscoelastic element additionally comprises at least one rigid component.

5. The apparatus of claim 4, wherein the viscoelastic element comprises a plurality of viscoelastic material components and a plurality of rigid components, the rigid components including at least a central rigid component and plural lateral rigid components, the viscoelastic material components being intermediate the central rigid component and the lateral rigid components, and the viscoelastic element being interposed between the primary structure and the secondary mass.

6. The apparatus of claim 1, wherein the secondary mass has a mass ratio ($\mu$) of 0.001 to 0.500 to that of the effective mass of the primary structure.

7. The apparatus of claim 1, wherein there are a plurality of viscoelastic elements interposed between the primary structure and the secondary mass.

8. An apparatus for controlling a dynamic response of a primary structure, the primary structure having a natural vibrational frequency, said damping apparatus comprising:

a housing connected to the primary structure;

a secondary mass positioned within the housing;

at least one spring interposed between the primary structure and the secondary mass;

at least one viscoelastic element, the viscoelastic element being interposed between the secondary mass and the housing;

wherein said at least one spring and said at least one viscoelastic element are tuned to a frequency to provide said damping apparatus with a vibrational frequency of approximately said natural vibrational frequency of said primary structure; and whereby when said dynamic response is initiated in the primary structure, the dynamic response is damped.

9. The apparatus of claim 8, further comprising at least one additional spring, the spring interposed between the housing and the secondary mass.

10. The apparatus of claim 9, wherein there are a plurality of springs operatively coupled between the primary structure and the secondary mass.

11. The apparatus of claim 8, additionally comprising a means for constraining the movement of the secondary mass relative to the primary structure, the constraining means operatively connected to the housing.

12. The apparatus of claim 8, additionally comprising a means for constraining the movement of the secondary mass relative to the primary structure, the constraining means operatively connected to the primary structure.

13. The apparatus of claim 8, wherein the viscoelastic element comprises at least one viscoelastic material component.

14. The apparatus of claim 8, wherein the secondary mass has a mass ratio ($\mu$) of 0.001 to 0.500 to that of the effective mass of the primary structure.

15. An apparatus for controlling a dynamic response of a primary structure, the primary structure having a natural vibrational frequency, said damping apparatus comprising:

a housing connected to the primary structure;

a secondary mass positioned within the housing;

at least one spring interposed between the housing and the secondary mass;

at least one viscoelastic element, the viscoelastic element being interposed between the secondary mass and the housing;

wherein said at least one spring and said at least one viscoelastic element are tuned to a frequency to provide said damping apparatus with a vibrational frequency of approximately said natural vibrational frequency of said primary structure; and whereby when said dynamic response is initiated in the primary structure, the dynamic response is damped.

16. A method for damping a dynamic response in a primary structure, the primary structure having a natural vibrational frequency and having vibrational nodes and antinodes, comprising:

a) providing at least one damping apparatus comprising:

a secondary mass;

at least one spring interposed between the primary structure and the secondary mass;

at least one viscoelastic element interposed between the primary structure and the secondary mass;

wherein said at least one spring and said at least one viscoelastic element are tuned to a frequency to provide said damping apparatus with a vibrational frequency of approximately said natural vibrational frequency of said primary structure; and b) positioning the damping apparatus proximate to the vibrational antinode of the primary structure.

17. The method of claim 16, additionally comprising providing a plurality of springs and operatively coupling the springs between the primary structure and the secondary mass.

18. The apparatus of claim 16, wherein the secondary mass has a mass ratio ($\mu$) of 0.001 to 0.500 to that of the effective mass of the primary structure.

19. A method for damping a dynamic response in a primary structure, the primary structure having a natural vibrational frequency and having vibrational nodes and antinodes, comprising:

a) providing at least one damping apparatus comprising:

a housing connected to the primary structure;

a secondary mass positioned within the housing;

at least one spring interposed between the primary structure and the secondary mass;

at least one viscoelastic element, the viscoelastic element being interposed between the secondary mass and the housing;

wherein said at least one spring and said at least one viscoelastic element are tuned to a frequency to provide said damping apparatus with a vibrational frequency of approximately said natural vibrational frequency of said primary structure; and b) positioning the damping apparatus proximate to the vibrational antinode of the primary structure.

20. The method of claim 19, additionally comprising providing a plurality of springs and operatively coupling the springs between the primary structure and the secondary mass.

21. The apparatus of claim 19, wherein the secondary mass has a mass ratio ($\mu$) of 0.001 to 0.500 to that of the effective mass of the primary structure.

* * * * *

UNITED STATES PATENT AND TRADEMARK OFFICE
CERTIFICATE OF CORRECTION

PATENT NO.: 5,564,536

DATED: October 15, 1996

INVENTOR(S): Ming-Lai Lai

Page 1 of 2

It is certified that error appears in the above-identified patent and that said Letters Patent is hereby corrected as shown below:

On the title page,
under "FOREIGN PATENT DOCUMENTS", the following references should be added:

--61-12569   01/23/86   Japan
  62-328916  12/25/87   Japan--

Column 2, under "OTHER PUBLICATIONS", the following references should be added:

--"Viscoelastic Dampers as Energy Dissipation", K.C. Chang, et al., Earthquake Spectra, Vol. 9, No. 3, 1993, pp. 371-387.

"Seismic Retrofit of Nonductile Reinforced Concrete Frames Using Viscoelastic Dampers", Fatch et al., Proceedings of Seminar on Seismic Isolation, Passive Energy Dissipation, and Active Control", Applied Technology Council, pp. 604-615.

"Structural Dampers", P. Mahmoodi, Journal of the Structural Division, Proceedings of the American Society of Civil Engineers, August, 1969, pp. 1661-1672.

"Design of Viscoelastic Dampers for Columbia Center Building", Keel et al., Building Motion in Wind, American Society of Civil Engineers, April 8, 1986, p. 65-82.

"Vibrations of a Beam with an Absorber Consisting of a Viscoelastic Beam and a spring-Viscous Damper", H. Yamaguchi, Journal of Sound and Vibration 103(3) (1985), pp. 417-425.

"Application of Viscoelastic Material for a Dynamic Damper", Journal of Vibration, Acoustics, Stress, and Rehability in Design, K.J. Kim et al., July 1986, Vol. 108, pp. 378-381.

"Use of Rubber Materials in Tuned Dampers for Vibration and Noise Control", William G. Halvorsen, et al., Rubbercon '88, pp. 1361-1377.

UNITED STATES PATENT AND TRADEMARK OFFICE
CERTIFICATE OF CORRECTION

PATENT NO.: 5,564,536
DATED: October 15, 1996
INVENTOR(S): Ming-Lai Lai

It is certified that error appears in the above-identified patent and that said Letters Patent is hereby corrected as shown below:

P. Mahmoodi, "Structural Dampers", <u>ASCE, Journal of Structural Division</u>, Vol. 95, No. ST8, August 1969, pp. 1661-1672.

C. Keel and P. Mahmoodi, "Design of Viscoelastic Dampers for Columbia Center Building", Proceedings ASCE, Seattle, WA, April 8, 1986, pp. 66-82.

P. Mahmoodi, L. Robertson, M. Yontar, C. Moy and L. Feld, "Performance of Viscoelastic Dampers in World Trade Center Towers", ASCE, Structures Congress, Aug. 17-20, 1987, Orlando, FL.

P. Mahmoodi and C. Keel, "Analysis and the Design of Multi-Layer Viscoelastic (VE) Damper for Tall Structures", Proceedings of Structures Congress 1989, ASCE, May 1989, San Francisco, CA.

P. Mahmoodi, "Design and Analysis of Viscoelastic Vibration Dampers for Structures", 3M Industrial Specialties Division.

Scotchdamp Viscoelastic Polymers - Suggested Purchase Specification, 3M Industrial Specialties Division 70-0702-0225-7(89.3) R1.--

Signed and Sealed this

Twenty-first Day of September, 1999

*Attest:*

Q. TODD DICKINSON

*Attesting Officer*      *Acting Commissioner of Patents and Trademarks*